United States Patent Office 3,297,016
Patented Jan. 10, 1967

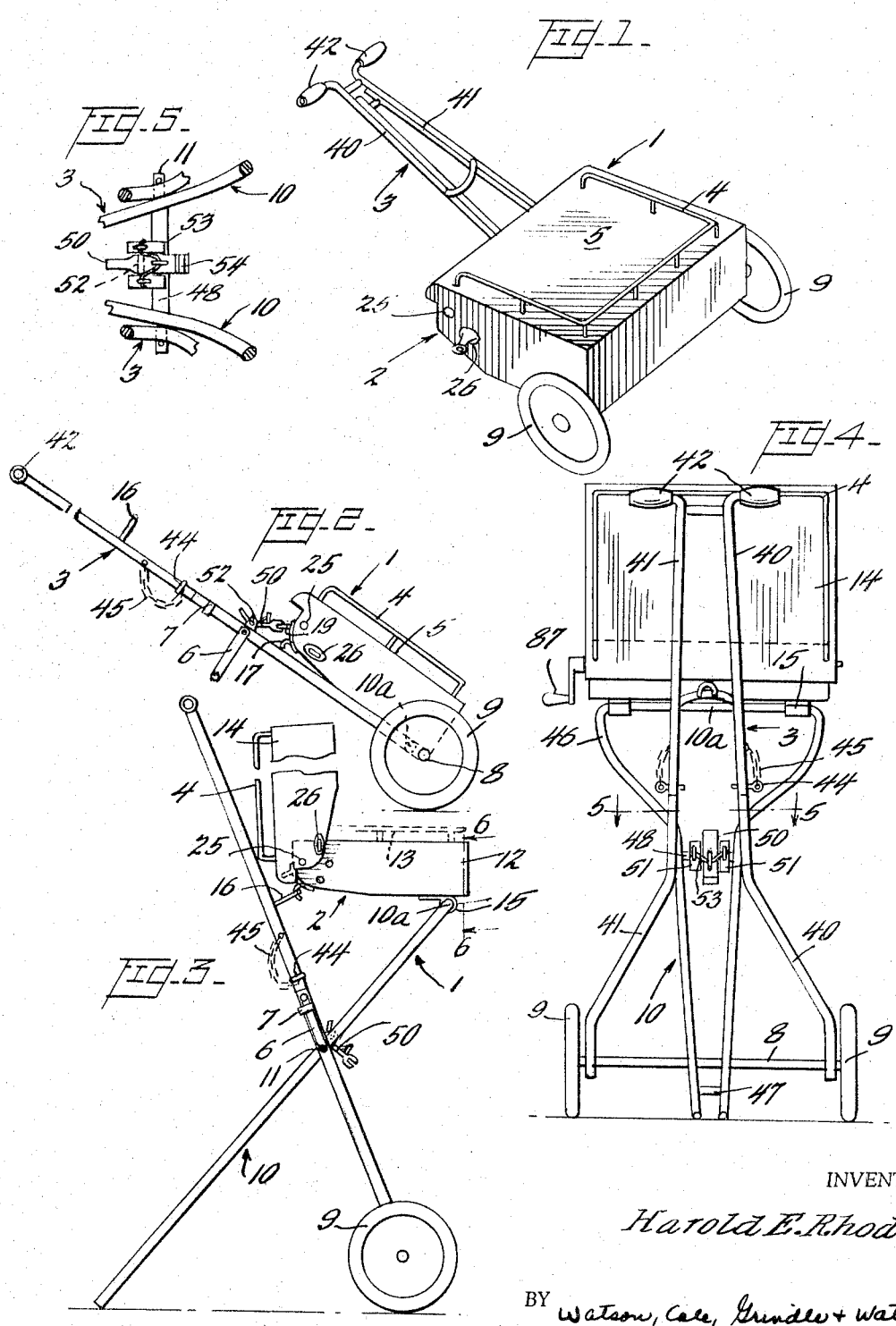

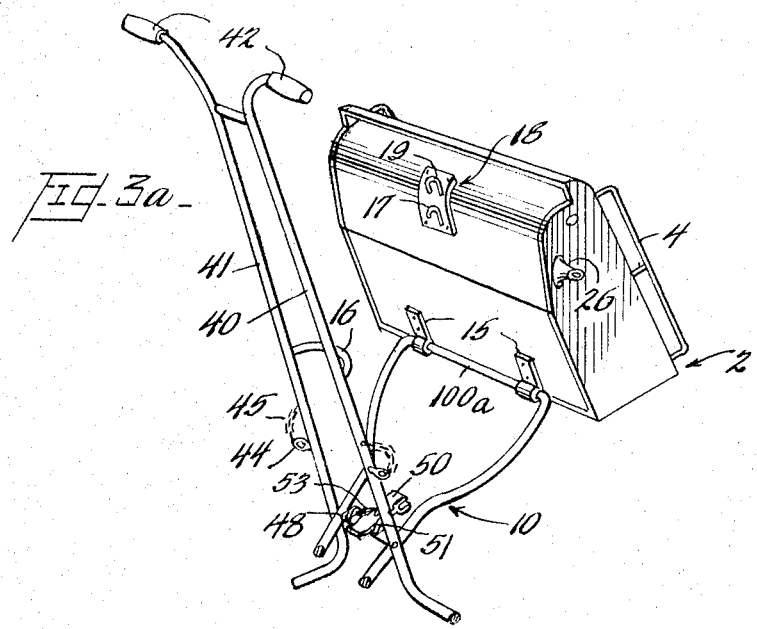
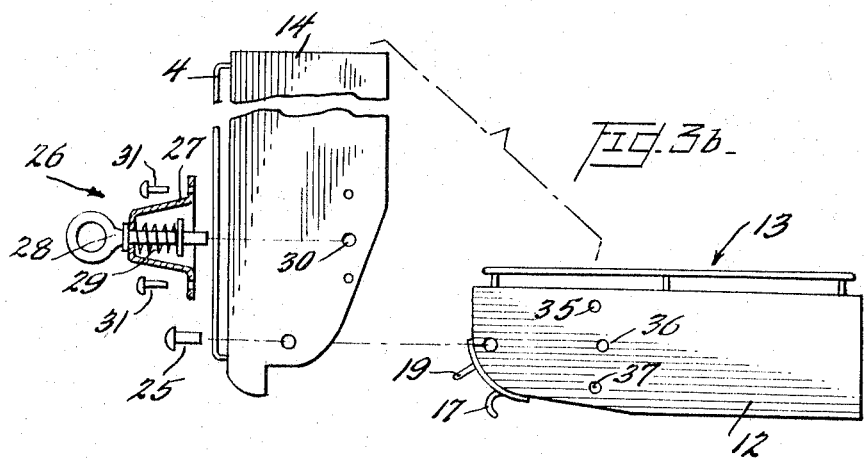
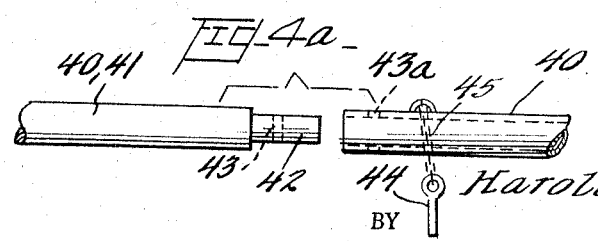

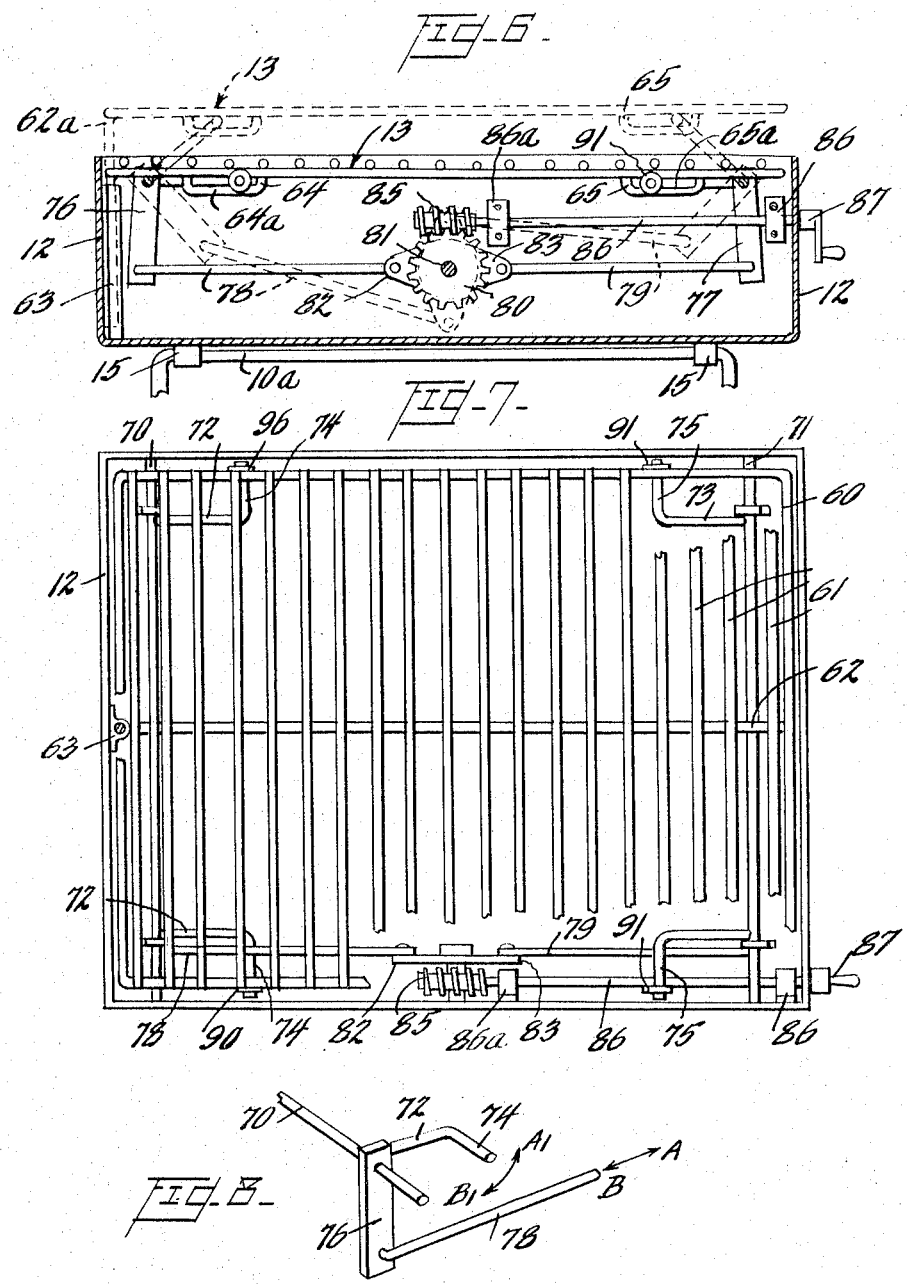

3,297,016
PORTABLE, FOLDING BARBECUE GRILL
Harold E. Rhodes, P.O. Box 53,
Etna Green, Ind. 46524
Filed Mar. 10, 1965, Ser. No. 438,625
14 Claims. (Cl. 126—25)

The present invention relates to outdoor barbecue grills and, more particularly, to a portable, folding outdoor grill and cart combination.

Outdoor barbecue grills of the portable type are normally stored inside until ready for use and then transported by the user to the desired position outdoors. This transporting function is usually carried out with the aid of wheels which are suitably mounted on the device.

In the past, attempts have been made to combine the features of a barbecue grill with the features of a wheeled cart that can be used to transport goods to the site of the picnic. However, insofar as I am aware, these attempts have not been entirely satisfactory, mainly, because in each attempt it has been necessary to sacrifice desirable features of either the grill or the cart in order to combine the two into one apparatus.

Therefore, it is one object of the present invention to provide an improved barbecue grill and cart combination.

According to the present invention, a device of the type described is provided that folds down to a compact package for storage purposes, which folded package presents a low center of gravity so that the device can be easily wheeled to the desired location without fear of tipping over. A related feature of the present invention concerns a novel latch means for securely fastening the integral firebox and grill in two positions so that the device can be advantageously utilized for its primary purpose as a barbecue grill or, secondarily, as a picnic cart, to transport not only the grill itself, but also, the food, camping supplies and the like to the desired location. The construction of the combined barbecue grill and cart of this invention is such that the various parts are firmly associated with each other during either of the two positions in such a manner that the set-up is very sturdy during the cooking operation and so that the assembly makes a minimum of noise and disturbance during the transporting operation.

Another aspect of the present invention relates to a new and improved mechanism for raising and lowering of the grill in relation to the firebox. Thus, a device is provided with a grill that is adjustable to an infinite number of positions to present varying amounts of heat to the food on the grill, wherein the entire actuating linkage except for the crank handle is compactly mounted within the confines of the firebox in order to improve the looks of the barbecue grill assembly and to prevent injury to the operator or other persons. In addition, this improved arrangement is such as not to become clogged with the fuel being used in the firebox and provides an even movement of the grill with the application of a minimum amount of force to the handle.

Thus, it is an additional object of the present invention to provide a portable, folding grill that is compact and presents a low center of gravity when in the folded position.

Another object of the present invention is to provide an apparatus of the combined grill and cart type wherein a combined firebox and grill is capable of being securely fastened in two positions for a dual purpose.

A further object of the present invention is to provide a folding grill and cart arrangement that is sturdy in construction and can easily and quickly be converted from the cooking position wherein the firebox and grill are firmly supported in a horizontal position at a substantial height above the ground to a transport position wherein the firebox and grill are in compact relation to the wheels of the device to allow for easy storage and portability.

It is still a further object of this invention to provide a firebox and grill assembly for use in a grill of the character described wherein said grill is adjustable to an infinite number of positions by mechanism arranged entirely within the firebox.

Still another object of this invention is to provide a grill of the type described wherein the firebox and grill assembly are of compact form with the adjusting means for said grill being of the infinitely variable type and not being subject to clogging or jamming from bits of fuel or foreign matter.

A further object of this invention is to provide a portable grill of the type described wherein the grill is supported above the firebox by adjustable linkage in the firebox that can be positioned in an infinite number of positions and wherein the grill is positioned with respect to said firebox by a downturned member on said grill that engages a channel in the firebox.

Still a further object of this invention is to provide a grill of the character described wherein the grill is vertically adjusted by means mounted in the firebox which gives an even movement over the full expanse of the grill with a minimum amount of applied force and which grill is not subject to lowering movement due to the weight of the grill and food so that once positioned the grill remains in position.

In this application, I have shown and described only the preferred embodiment of the invention, simply by way of illustration of the best mode contemplated by me of carrying out my invention. However, the invention is capable of other and different embodiments, and its several details are capable of modification in various obvious respects, all without departing from the invention. Accordingly, the drawings and description are to be regarded as illustrative in nature, and not as restrictive.

In the accompanying drawings:

FIGURE 1 is a perspective view of the barbecue grill and cart combination of the present invention in the folded position;

FIGURE 2 is a side elevational view of the barbecue grill of the present invention in the folded position;

FIGURE 3 is an elevation of the barbecue grill in the cooking position;

FIGURE 3a is a detailed illustration of the adjustable hood arrangement of the present invention with the parts separated for clarity;

FIGURE 4 is a rear view of the barbecue grill in the erected position;

FIGURE 4a is a detailed illustration of the detachable handle arrangement of the present invention;

FIGURE 5 is a detailed cross-sectional view taken along lines 5—5 of FIG. 4;

FIGURE 6 is a cross-sectional view of the firebox and grill assembly taken along line 6—6 of FIGURE 3;

FIGURE 7 is a top view of the grill and firebox assembly, the grill being broken away in parts to illustrate the operating mechanism for raising and lowering the grill;

FIGURE 8 is a detailed perspective view of a portion of the operating mechanism of the grill.

Referring now to the drawings and to FIGURE 1 in particular, it will be remembered that the present invention concerns a portable barbecue grill and cart combination, generally represented by the reference numeral 1. In this figure, the combination is illustrated in its folded position for transportation to and from the desired location of use. In this folded position, a firebox, grill and hood assembly, generally represented by the reference numeral 2, is located along the lower half of the barbecue grill 1 so that the center of gravity of the same is advantageously low for ease and convenience of the transporting operation. An upwardly extending handle 3 is provided to assist the user in the transporting operation, as will be clear to those skilled in this art.

As indicated above, the apparatus of the present invention can be utilized as a transporting cart when folded in the position illustrated in FIGURE 1. To provide for such a function a guard rail 4 is provided along each side and the front end of the firebox, grill and hood assembly 2. Thus, the guard rail 4 defines a carrying surface 5 that is designed to accommodate food, camping supplies and the like for transporting the same to the desired location of use. Accordingly, it can be seen that in the position of FIGURE 1 the user of the apparatus of the present invention can transport the barbecue grill itself and at the same time all of the necessary supplies for the picnic with ease.

Optionally attached to the handle 3 is a conventional pivotal kick stand 6 which is provided to keep the handle 3 off of the ground when the apparatus is not being pushed or pulled, as is best illustrated in FIG. 2. A spring clip 7 is disposed along the handle 3 to retain the kick stand 6 in an out of the way position when it is not being used.

Referring further to FIGURE 2, it can be seen that the handle 3 supports an axle 8 which in turn supports a pair of relatively large diameter wheels 9 (see FIG. 1). It will be noted from the relationship of the wheels 9 shown in FIGURES 1 and 2, that the firebox, grill and hood assembly 2 is protected from damage due to accidental ramming of objects, such as a wall that might be in the path of the barbecue grill 1 during the transporting operation.

When the apparatus of the present invention is erected in the cooking position, as shown in FIGURE 3 of the drawings, it can be observed that the handle 3 serves as one leg for the barbecue grill 1. Another leg, generally represented by the reference numeral 10 is pivotally mounted at approximately the midpoint of the handle 3 by a pivot axle 11. The firebox, grill and hood assembly 2 is disposed above the upper end of a leg 10 in the cooking position of FIGURE 3 and said assembly 2 comprises a firebox 12, a grill or grid 13 and a hood 14. The leg 10, comprises parallel spaced members, interconnected at their upper ends by a transverse section 10. This section 10a is journalled in bearings 15 on the lower face of the firebox to thus provide a hinged connection. The eye members 15 are located on the bottom of the firebox 12 adjacent the edge of the bottom closest to the front end of said firebox 12 and are arranged so that said front edge of the firebox 12 can rest on the axle 8 is the folded position of FIG. 2. The rear end of the firebox 12 is supported by a cross-member 16 mounted along the upper portion of the handle 3. To perform this supporting function the bottom of the firebox 12 is provided with a hook 17 disposed along the rear edge of the bottom of said firebox 12.

To further illustrate the mounting of the firebox 12 on the handle 3 and the leg 10, reference is now made to 3a, which illustrates the manner in which the apparatus of the present invention is erected for use in cooking. As illustrated in this figure, the hook 17 is or may be a part of a catch assembly, generally represented by the reference numeral 18, and further comprising a loop 19, which serves to position the firebox, grill and hood assembly 2 in the folded position, as will be described in detail later. The catch assembly 18 is suitably mounted on the bottom of the firebox 12 adjacent the rear edge thereof by any number of fastening means 20. Being so positioned, the hook 17 is easily engaged with the cross-member 16 by simply moving the firebox, grill and hood assembly 2 back towards the handle 3 in such a manner as to allow the hook 17 to receive the cross-member 16. When this is done, the barbecue grill 1 is erected in the position of FIGURE 3; and due to the weight of the assembly 2, the upper portions of the handle 3 and the leg 10 are urged apart about their pivotal interconnection 11 so that the hook 17 will be retained in engagement with the cross-member 16 by the force tending to separate said upper portions. When it is wished to fold the barbecue grill 1 into the position illustrated in FIGURE 1, the reverse of the operation described above is followed and the device is once again ready to be transported as desired.

The hood 14 is adjustable on the firebox 12 about an axis defined by suitable pins 25 positioned on both sides of the firebox 12. A spring latch 26 mounted on one or both sides of the hood 14 maintains the hood in its adjusted positions. For example, the latch 26 is or may be positioned along the lower edge of a side of the hood 14 as shown in FIGURE 3, and the spring latch 26 is or may be of the construction shown in FIGURE 3b, wherein the various parts are separated for ease of illustration (note dashed arrows for final assembled positions). In the preferred embodiment shown, a housing 27 is adapted to receive a latch pin 28 with a compression spring 29 positioned so as to cause the terminal end of the pin 28 to extend through an aperture 20 in the hood 14 when the spring latch 26 is properly positioned by suitable fastening means 31. A plurality of apertures 35, 36 and 37 are provided in the firebox 12 so as to be in alignment with the aperture 30 in the hood 14 in various positions of the hood 14 in relation to the firebox 12.

In order to expose the grill 13 for cooking, a finger is inserted in the hole provided by the free end of the latch pin 28, the latch pin 28 is pulled free of the firebox 12, and, then, the hood 14 is positioned so that the aperture 30 in the hood 14 aligns with the aperture 35 in the firebox 12 whereby the latch pin 28 will retain the hood 14 in the open position when said latch pin 28 is released. Similarly, the hood 14 can be positioned in an intermediate position by following the same procedure to locate the terminal end of the latch pin 28 in the hole 36; it being understood that the intermediate position can be used to protect the grill during the igniting and cool-down periods of the fire in the firebox 12. The aperture 37 is positioned to accommodate the latch pin 28 when the hood 14 is in a closed position; in which position the firebox 12 is completely covered and protected. It will now be evident that by providing the apertures 35–37 for receiving the latch pin 28 in each of the various positions of the hood 14, it is possible for the hood 14 to be firmly associated with the firebox 12 at all times.

As best shown in FIGURE 4 of the drawings, the handle 3 terminates at the lower end thereof in a fork-like structure; the entire handle 3 being constructed from a pair of preferably tubular members represented by the reference numerals 40, 41 which support the axle 8 upon which the wheels 9 are mounted. The upper portion of the handle 3 terminates in suitable conventional grips 42 for engagement by the hands of the user during the transporting operation of the apparatus of the present invention. The upper portion is advantageously removable from the fork-like structure 40 for further compact storage of the apparatus.

This feature of the invention can take the form of the telescopic arrangement shown best in FIGURE 4a wherein the ends of upper portions of the tube members 40, 41 are adapted to receive the lower portions of said members 40, 41. To attach the upper portions of the members 40, 41, the lower portions are provided with reduced ends 42 whereby apertures 43 and 43a can be aligned to receive a key 44, which is retained for convenience by a suitable chain 45.

Also as best illustrated in FIGURE 4, the leg 10 is preferably fabricated from a single piece of tubular material 46 and said leg 10 tapers from its upper cross portion 10a down to a ground-engaging foot portion 47. Associated with the leg 10 intermediate along the length thereof, is a cross-support member 48 which is adapted to accommodate the pivot axle 11 and to strengthen the leg 10.

As indicated above, the invention contemplates a clamp 50 for firmly retaining the firebox, grill and hood assembly 2 in the transport position of FIGURES 1 and 2. To accomplish this purpose, the clamp 50 is mounted for pivotal movement on the cross-support member 48 of the leg 10 by means of a pair of outwardly extending ears 51, which are adapted to receive a support shaft 52 of the clamp 50.

As best illustrated in FIGURE 5, the clamp 50 is retained in a neutral position by the two-way leaf or torsion spring 53; the neutral position of the clamp 50 being illustrated in FIGURE 3 where it can be seen that such position is the case where the clamp 50 is substantially parallel with the leg 10. The clamp 50 has a forward U-shaped portion 54 which is adapted to cooperate with the loop 19 of the catch assembly 18 in both directions of movement of said firebox.

In operation, the firebox, grill and hood assembly 2 is retained in its folded position by engagement of the clamp 50 with the loop 19 as shown in FIGURE 2. During the fold-down operation, it will be noted that since the spring 53 is a two-way device, the loop 19 will slide across the upper portion of the U-shaped forward end 54 until the assembly 2 reaches its final resting position at which time the spring 53 will urge the clamp 50 back to its neutral position of FIGURE 2 whereupon the forward end 54 engages the loop 19 to firmly retain the assembly 2 in the transport position. This feature of the present invention is particularly advantageous in holding the assembly 2 steady during the transport operation and thus in eliminating noise which might otherwise occur due to a loose association of parts. When it is desired to erect the barbecue grill 1 to the cooking position of FIGURE 3, assuming that the latch 26 is firmly in place in the aperture 37, the guard rail 4 is grasped and pulled upwardly until the loop 19 mounted on the firebox 12 disengages from the spring-biased clamp 50, and while still grasping the guard rail 4 the assembly 2 may be moved through the position of FIGURE 3a until the hook 17 is firmly engaged with the cross-member 16, as clearly illustrated in FIGURE 3.

Referring now to FIGURES 6–8 of the drawings, the novel mechanism for raising and lowering of the grill 13 will now be described. The grill 13 is fabricated from a closed rectangularly shaped frame 60 with transverse rods 61 extending across said grill 13. A central rod 62 extends the full width of the grill 13 and has a downwardly extending portion 62a for guiding the vertical movement of the grill 13 by engagement with a channel-forming member 63, which is positioned along the inside wall of the firebox 12. Depending from the frame 60 along the front and rear edges of said grill 13, are a pair of U-shaped rods 64, 65 forming a pair of slideways 64a and 65a along each of said edges, respectively. The grill 13 is adapted to be raised from the full line position of FIGURE 6 to the dotted line position through the use of actuating mechanism which is advantageously mounted entirely within the confines of the firebox 12 and now to be described.

Referring to FIGURE 7, a rock-shaft 70 is pivotally mounted by suitable means positioned in the ends of the firebox 12 along the left-hand side of said firebox 12. Similarly, a rock-shaft 71 is pivotally mounted along the opposite side of the firebox 12 in vertical alignment with the rock-shaft 70, as can be seen in FIGURE 6. Each of the rock-shafts 70 and 71 have a pair of outwardly extending arms 72, 73, respectively mounted thereon. The arms 72 and 73 extend substantially normal to the rock-shafts 70, 71, respectively, and each of the arms 72, 73 terminate in a crank pin or wing portion 74, 75, respectively, which are operatively received in slideways 64a and 65a in such a manner that upon rotation of the rock-shafts 70, 71 by associated rock levers 76, 77, the wing portions 74, 75 are raised and lowered in an arc-like fashion to raise and lower the grill. The rock levers 76, 77 are pivoted at the ends opposite the rock-shafts 70, 71 to interconnecting links 78, 79, respectively. Using this structure, the grill 13 may be raised and lowered to an infinite number of adjusted positions in such a manner that the grill 13 remains level over the full expanse of its surface.

Referring now to FIGURE 8, in operation, if the interconnecting link 78 is moved in the direction of arrow A, then the wing 74 will be moved along arc $A_1$, as clearly illustrated. Conversely, if the interconnecting link 78 is moved along the path indicated by arrow B, the rock lever 76 and the rock-shaft 70 actuates the arm 72 and the dependent wing 74 so that the latter is moved along a path $B_1$. Thus, it can be seen that inasmuch as the wings 74, 75 engage the slideways 64a, 65a, respectively, at each of the four corners of the grill, and inasmuch as the downturned portion 64a of the central rod 62 engages the channel-forming member 63, then the grill 13 is capable of the raising and lowering movement described.

The adjusting mechanism for actuating the interconnecting links 78, 79 for raising and lowering the grill 13 involves a worm wheel 80 mounted on a pivot-shaft 81 on the inside of the front end of the firebox 12. Operatively associated with the worm-wheel 80 are a pair of oppositely extending crank-levers 82, 83 which pivotally engage the interconnecting links 78, 79 respectively. The worm-wheel 80 is driven by the worm 85 that is fixed to the drive-shaft 86; the latter being rotatively mounted by a pair of journals 86a along the inside wall of the front end of the firebox 12. The end of the drive shaft 86, opposite the worm-carrying end, extends through the side of the firebox 12 and operatively carries a hand crank 87 for actuation of the mechanism just described.

Results and advantages of the actuating linkage and the adjusting mechanism of the present invention should now be evident to those skilled in the art. The worm and worm-wheel 85, 80 are desirably positioned on the inside of the firebox 12 so as to improve the looks of the barbecue grill 1 by presenting an uncluttered outside appearance and at the same time the internal mounting of this mechanism prevents the chance of injury to the operator or to other persons that might be close. Also, it is noted that the worm 85 will not be affected by foreign matter or bits of fuel that might become disposed within the teeth of the worm-wheel 80 since the action of the threads of the worm 85 will tend to clear the passages between the teeth as it is operated. It is further noted that the interconnecting link and crank-lever arrangement extending to each side of the firebox 12 for operating the pair of crank-shafts 70, 71 is easily operated by the worm and worm-wheel arrangement, 85, 80 since a substantial force will be transferred to the former with a minimum of force being applied by the operator to the hand-crank 87. Also, once the grill 13 has been positioned, it automatically remains in position due to the locking feature of said worm and worm-wheel arrangement, that is, the grill is not subject to lowering movement that might otherwise be caused by the weight of the grill and the food being prepared.

The wings 74, 75 can carry suitable washers 90, 91 or other fastening means, respectively, to retain the wings 74, 75 in engagement with the slideways 64a, 65a, if desired. When it is desired to remove the grill 13 for cleaning purposes or for filling of the firebox with fuel, the washers 90, 91 are removed and then the arms 72, 73 are engaged by the operator and flexed away from the front or rear end of the firebox 12, as the case may be, so that the wings 74, 75 may be lifted free of the slideways 64a and 65a in an easy manner.

In this application, I have shown and described only the preferred embodiment of the invention, simply by way of illustration of the best mode contemplated by me of carrying out my invention. However, the invention is capable of other and different embodiments, and its several details are capable of modification in various obvious respects, all without departing from the invention. Accordingly, the drawings and description are to be regarded as illustrative in nature, and not as restrictive.

What is claimed is:

1. In a combination portable outdoor grill and cart, an elongated handle portion terminating at one end in an axle-supporting fork, an axle mounted across said fork, wheels mounted on said axle, an elongated leg portion pivoted intermediate its ends on said handle portion intermediate its ends for angular movement relative to said handle portion between a folded position in which said leg portion lies in the plane of the handle portion and an erected position in which said portions are substantially angularly displaced from each other, said leg portion terminating at one end in a ground-engaging foot and at the other end in a firebox-supporting member, a firebox having sides, a front end, a rear end and a bottom, said firebox being pivotally mounted adjacent one edge of said bottom on said member for angular movement toward and away from the plane of said leg portion, catch means on said firebox adjacent the opposite edge of said bottom, means on said leg portion for engaging said catch means in the folded position of said firebox, and means on said handle portion for engaging said catch means in the erected position of said firebox.

2. A device according to claim 1, including a hood having a top surface, a front end portion, a rear end portion, and side portions adapted to cover said firebox, said hood being pivoted to said firebox adjacent said opposite edge, said hood being provided with guard rails projecting above said top surface along the edges of said surface adjacent said front end portion.

3. A device according to claim 1, the inside of said firebox being provided with a vertically extending guide channel, a food-supporting grill substantially coextensive with said firebox and having at one side a down-turned member slidably engaging in said channel, an actuating linkage supported in said firebox and connected with said grill for raising and lowering the latter, and handle means projecting outwardly from said firebox for operating said linkage.

4. A device according to claim 3, said grill having side and end edges, a pair of slideways along each end edge, one slideway adjacent each of said side edges, said linkage comprising a pair of rock shafts journaled across said firebox, one rock shaft adjacent each of said sides of said firebox, a pair of outwardly extending arms carried by each of said rock shafts, each of said arms having a wing portion substantially normal to said arms engaging an adjacent slideway for imparting movement to said grill, and adjustable means operated by said outwardly projecting means for presenting said rock-levers to an infinite number of positions.

5. A device according to claim 4, said last means comprising a worm wheel mounted for rotation adjacent one of said ends of said firebox, a worm engaging said worm wheel and operatively connected to said outwardly projecting means, two oppositely directed crank levers mounted for angular movement with said worm wheel, and means operatively connecting each of said crank levers with one of said rock shafts.

6. A device according to claim 1, including a hood adapted to cover said firebox and pivoted to a portion thereof adjacent said opposite edge, and a latch means on said hood adapted to cooperate with said firebox to position said hood in the desired relationship to said firebox and wherein said engaging means on said leg portion comprises a pivotal clamp normally extending substantially parallel to said leg portion, the forward end of said clamp having a generally U-shaped portion for engaging said catch means and a torsion spring for retaining said clamp in said parallel position.

7. A device according to claim 6, wherein said hood comprises a top and downwardly extending side and end portions, said side portions being adapted to cover the sides of said firebox, and said latch means comprises a plunger mounted on one of said side portions, said plunger being adapted for selective reciprocating movement perpendicular to said one of said side portions and means on said sides of said firebox to receive said plunger.

8. A device according to claim 7, wherein said receiving means includes a first aperture for locking said hood in an open position, a second aperture for locking said hood in a closed position, and a third aperture between said first and second apertures for locking said hood in an intermediate position.

9. In a portable outdoor grill, a firebox having sides, a front end, a rear end and a bottom, one side of said firebox being provided with a vertically extending guide channel, a food-supporting grill substantially coextensive with said firebox and having at one side a down-turned member slidably engaging in said channel, actuating linkage supported in said firebox and connected with said grill for raising and lowering the latter, said grill having side and end edges, a pair of slideways along each of said end edges, one slideway adjacent each of said side edges, said linkage comprising a pair of rock shafts journaled across said firebox, one rock shaft adjacent each of said sides of said firebox, a pair of outwardly extending arms carried by each of said rock shafts, each of said arms having a wing portion substantially normal to said arms engaging an adjacent slideway for imparting movement to said grill, adjustable means for presenting said rock shafts to an infinite number of positions, and means projecting outwardly from said firebox for operating said adjustable means.

10. A device according to claim 9, said adjustable means comprising a worm wheel mounted for rotation on one of said ends of said firebox, a worm engaging said worm wheel and operatively connected to said outwardly projecting means, two oppositely directed crank levers mounted for angular movement with said worm wheel, and means operatively connected each of said crank levers with one of said rock shafts.

11. In a combination portable outdoor grill and cart, an elongated handle portion terminating at one end in an axle supporting fork, an axle mounted across said fork, wheels mounted on each end of said axle, an elongated leg portion pivoted intermediate its ends on said handle portion intermediate its ends for angular movement relative to said handle portion between a folded position in which said leg portion lies in the plane of the handle portion and an erected position in which said portions are substantially angularly displaced from each other, said leg portion terminating at one end in a ground-engaging foot and at the other end in a firebox supporting member, a firebox having sides, a front end, a rear end, and a bottom, said firebox being pivotally mounted adjacent said front end of said firebox along one edge of said bottom on said firebox supporting member for angular movement toward and away from said folded position, said one edge of said bottom engaging said axle in said folded position whereby said wheels extend upwardly along the sides of said firebox and outwardly from said front end for protection of said firebox in said folded position, and means adjacent said rear end of said firebox for positively positioning said firebox in said folded position, said positioning means including catch means on said firebox along the edge of said bottom opposite to said one edge, means on said leg portion for engaging such catch means in said folded position, and means on said handle portion for engaging said catch means in said erected position.

12. The combination of claim 11, further including a hood having a top surface, a front end portion, a rear end portion, and side portions adapted to substantially cover said firebox, said hood being pivoted to said firebox adjacent said rear end portion, said hood being provided with guard rails projecting above said top surface along the edges of said surface adjacent said front end portion and said side portions.

13. The combination of claim 12, further providing a latch means on said hood adapted to cooperate with said firebox to position said hood in the desired relationship with said firebox, said latch means comprising a plunger mounted on one of said side portions of said hood, said plunger being adapted for selective reciprocating movement perpendicular to said side portion and means on the adjacent side of said firebox to receive said plunger.

14. A portable outdoor grill, a firebox having sides, a front end, a rear end and a bottom, said firebox being provided with a vertically extending guide channel, a food-supporting grill substantially coextensive with said firebox and having a downturned member slidably engaging in said channel, actuating linkage supported in said firebox and connected with said grill for raising and lowering the latter, said grill having side and end edges, a pair of U-shaped members depending from said grill along each of said end edges and defining a pair of slideways, one slideway of each pair adjacent each of said side edges, said linkage comprising a pair of rock-shafts channeled across said firebox, one rock-shaft adjacent each of said sides of said firebox, a pair of outwardly extending arms carried by each of said rock shafts, each of said arms being substantially normal to its rock shaft and having a wing portion substantially normal to its arms, said arms engaging an adjacent slideway for imparting movement to said grill, a pair of rock levers, one rock lever mounted for rotation with each of said rock shafts at one end thereof, a pair of interconnecting links, one link being pivotally connected to each of said rock levers adjacent the end of said rock lever remote from said rock shaft, worm wheel mounted for rotation on one of said ends of said firebox, a worm engaging said worm wheel, two oppositely directed crank levers mounted for annular movement with said worm wheel, said interconnecting links being connected at the free end of said crank levers and crank means connected to said worm and projecting outwardly from said firebox for rotating said worm for effecting raising and lowering of said grill.

References Cited by the Examiner

UNITED STATES PATENTS

| | | | |
|---|---|---|---|
| 2,325,828 | 8/1943 | Betts | 126—25 |
| 2,484,239 | 10/1949 | Moon et al. | 126—25 |
| 2,536,954 | 1/1951 | Olsen. | |
| 2,577,963 | 12/1951 | Hagopian | 126—25 |
| 2,582,720 | 1/1952 | Roberts | 126—25 |
| 2,787,996 | 4/1957 | Rumsey | 126—25 |
| 2,994,315 | 8/1961 | Bussing | 126—25 X |

References Cited by the Applicant

UNITED STATES PATENTS 3,008,463  11/1961  Frank.

FREDERICK KETTERER, *Primary Examiner.*